(12) United States Patent
Nojiri et al.

(10) Patent No.: US 10,011,359 B2
(45) Date of Patent: Jul. 3, 2018

(54) AIRCRAFT GALLEY UNIT

(71) Applicant: JAMCO CORPORATION, Mitaka-shi, Tokyo (JP)

(72) Inventors: Kenji Nojiri, Mitaka (JP); Yoshihisa Tsutsui, Mitaka (JP)

(73) Assignee: JAMCO CORPORATION, Mitaka-shi (JP)

( * ) Notice: Subject to any disclaimer, the term of this patent is extended or adjusted under 35 U.S.C. 154(b) by 0 days.

(21) Appl. No.: 15/549,749

(22) PCT Filed: Mar. 13, 2015

(86) PCT No.: PCT/JP2015/057444
§ 371 (c)(1),
(2) Date: Aug. 9, 2017

(87) PCT Pub. No.: WO2016/147247
PCT Pub. Date: Sep. 22, 2016

(65) Prior Publication Data
US 2018/0044023 A1 Feb. 15, 2018

(51) Int. Cl.
*B64D 11/04* (2006.01)
(52) U.S. Cl.
CPC .................................. *B64D 11/04* (2013.01)
(58) Field of Classification Search
CPC .......................................................... B64D 11/04
USPC .............................. 4/625–627, 639, 640, 642
See application file for complete search history.

(56) References Cited

U.S. PATENT DOCUMENTS

| | | | | |
|---|---|---|---|---|
| 176,828 | A * | 5/1876 | Bond | A47K 1/02 312/306 |
| 1,320,984 | A * | 11/1919 | Bressler | A47K 1/02 4/627 |
| 2,814,809 | A * | 12/1957 | Boyle | E03C 1/182 312/228 |
| 3,206,770 | A * | 9/1965 | Carlson | A47K 1/12 4/638 |
| 4,072,157 | A * | 2/1978 | Wines, Jr. | A47K 1/02 134/107 |

(Continued)

FOREIGN PATENT DOCUMENTS

| | | |
|---|---|---|
| JP | 2014-511792 A | 5/2014 |
| JP | 2015-503973 A | 2/2015 |
| WO | 2015/162575 A2 | 10/2015 |

OTHER PUBLICATIONS

International Search Report dated Jun. 2, 2015, issued in counterpart International Application No. PCT/JP2015/057444, w/English translation. (3 pages).

(Continued)

*Primary Examiner* — Richard R Green
*Assistant Examiner* — Michael B Kreiner
(74) *Attorney, Agent, or Firm* — Westerman, Hattori, Daniels & Adrian, LLP

(57) ABSTRACT

In order to provide an aircraft galley which is equipped with a sink structure ensuring a work space for crews in a galley and a wide drainage region, an aircraft galley unit according to the present invention includes a hot and cold water supply system, a sink structure, and a work table, wherein the sink structure is formed of a double structure including a first sink in which a portion of the work table is formed as a recessed portion, and a box-shaped second sink provided above the first sink.

5 Claims, 2 Drawing Sheets

(56) References Cited

U.S. PATENT DOCUMENTS

| | | | | |
|---|---|---|---|---|
| 4,369,532 A * | 1/1983 | Houchins | E03C 1/182 |
| | | | 4/619 |
| 8,424,128 B2 * | 4/2013 | Dvorak | A47B 77/06 |
| | | | 4/630 |
| 8,944,376 B2 * | 2/2015 | Godecker | B64D 11/04 |
| | | | 244/118.5 |
| 9,410,310 B1 * | 8/2016 | Eckert | E03C 1/324 |
| 9,708,064 B2 * | 7/2017 | Vandewall | B64D 11/02 |
| 2006/0042003 A1 * | 3/2006 | Ouyoung | E03C 1/01 |
| | | | 4/642 |
| 2007/0228216 A1 * | 10/2007 | Wenstrom | B64D 11/04 |
| | | | 244/118.5 |
| 2010/0140398 A1 * | 6/2010 | Cunningham | A47J 31/005 |
| | | | 244/118.5 |
| 2012/0204342 A1 * | 8/2012 | Hotaling | A23G 9/045 |
| | | | 4/625 |
| 2012/0285335 A1 * | 11/2012 | Cunningham | B64D 11/04 |
| | | | 99/323.1 |
| 2013/0174743 A1 | 7/2013 | Kelly et al. | |
| 2014/0047635 A1 * | 2/2014 | Masoud | E03C 1/01 |
| | | | 4/639 |
| 2017/0050733 A1 * | 2/2017 | Miron | B64D 11/04 |

OTHER PUBLICATIONS

Written Opinion dated Jun. 2, 2015, issued in counterpart International Application No. PCT/JP2015/057444, w/English translation. (6 pages).

Decision to Grant a Patent dated Jul. 5, 2016, issued in counterpart Japanese Patent Application No. 2015-532638, w/English translation. (6 pages).

Office Action dated Dec. 20, 2017, issued in counterpart German Application No. 112015006173.8. (5 pages).

* cited by examiner

AIRCRAFT GALLEY UNIT

TECHNICAL FIELD

The present invention relates to a structure of a galley, i.e., kitchen, unit installed in a passenger aircraft, and specifically, relates to a structure of a sink provided on the galley unit.

BACKGROUND ART

In an aircraft galley installed in a passenger aircraft, there are demands to cut down overall space of the galley unit so as to increase number of sheets and enable increase of passengers, or to ensure distance between sheets in consideration of ride quality of the passengers.

Meanwhile, along with the increase of the number of passengers, the amount of foods and drinks being served is also increased, such that heating or cooling of foods and drinks or supplying of hot water must be performed in the limited galley space, and an integrated-type galley unit is proposed in which heating devices, cooling devices, hot water serving devices and the like are integrated (refer for example to Patent literature 1).

Further, Patent Literature 1 discloses a configuration in which the aircraft galley is equipped with a beverage center portion, and a drawer type sink is formed to the beverage center portion.

CITATION LIST

Patent Literature

[PTL 1] Japanese Translation of PCT International Application Publication No. JP-T-2014-511792

SUMMARY OF INVENTION

Technical Problem

According to the prior art aircraft galley described above, a sink, serving as a drainage receiving tray, is formed independently from a slide drawer-type deck portion, and the fluid can be received if the sink is drawn out when the beverage center portion is used, but there was a drawback in that the portion of the area on the work deck portion occupied by the sink cannot be used as space for performing other operations.

Moreover, since the area for receiving fluid is restricted to the sink portion, there was a drawback in that the size of the sink must be increased to enable water to be poured into large dishes or tableware such as pots, or to wash such large tableware.

Therefore, an object of the present invention is to provide an aircraft galley in which work space for crews is ensured in the galley, and equipped with a sink structure ensuring a wide drainage region.

Solution to Problem

In order to solve the problems described above, the aircraft galley unit according to the present invention is equipped with a hot and cold water supply system, a sink structure, and a work table, wherein the sink structure is composed of a double structure including a first sink in which a portion of the work table is formed as a recessed portion, and a box-shaped second sink arranged above the first sink.

According to an embodiment of the present invention, the first sink has a wider area than the second sink on the work table.

Further, the second sink is a drawer type sink that can be drawn out or retracted from above the work table.

Further, the second sink is formed to have a depth deeper than the first sink.

Even further, the second sink may be configured to include a drainage port formed on a bottom portion, and drainage from the second sink may be flown through the drainage port to the first sink.

Moreover, the second sink may be configured to include a means for closing the drainage portion, such that fluid can be stored in the second sink.

Advantageous Effects of Invention

According to the aircraft galley unit of the present invention, the work space for crews can be ensured in the galley, and a sink structure ensuring a wide drainage region can be realized.

DESCRIPTION OF EMBODIMENTS

Figure 1:
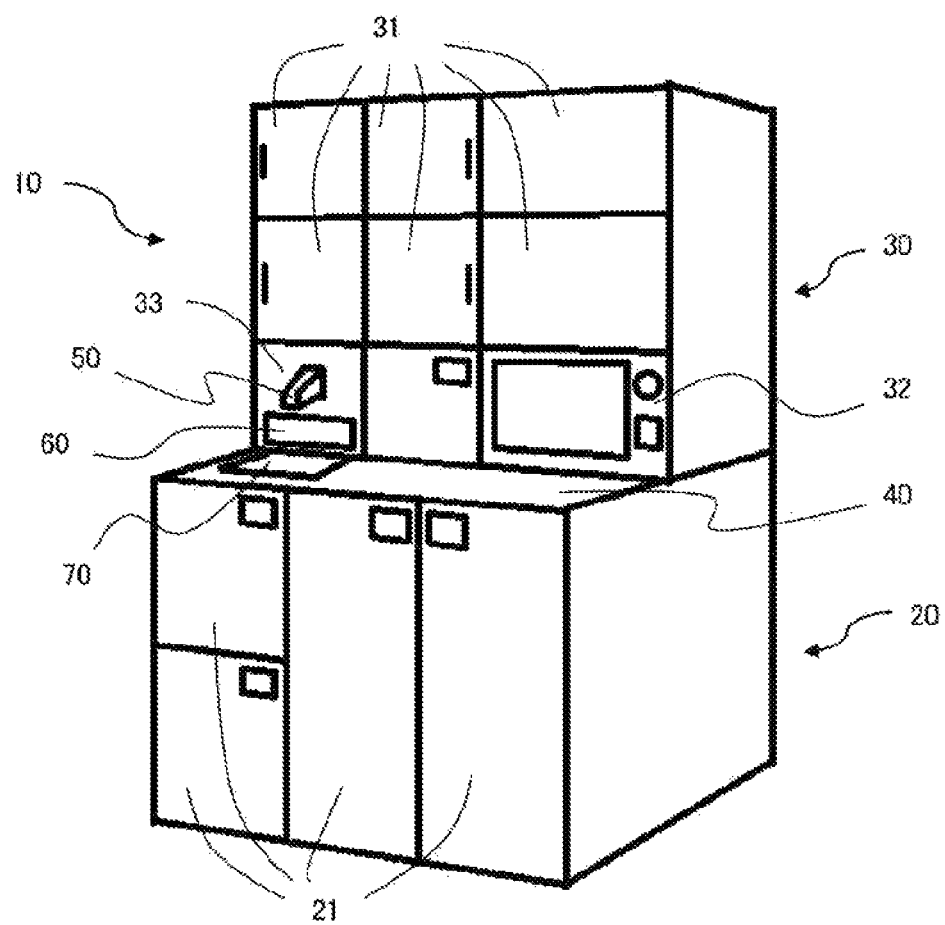
FIG. 1 is a perspective view illustrating an outline of an aircraft galley unit installed in an aircraft according to the present invention.

FIG. 1 is a perspective view illustrating an outline of an aircraft galley unit installed in an aircraft.

As illustrated in FIG. 1, an aircraft galley unit 10 according to the present invention includes a lower rack 20, an upper rack 30, and a work table 40 positioned on an upper surface of the lower rack 20.

The lower rack 20 includes one or a plurality of storage areas 21. FIG. 1 illustrates an example where four storage areas 21 are provided, but the number is not restricted thereto.

The storage areas 21 store, for example, stocks of foods and drinks, and carts used by the crew for serving meals. FIG. 1 illustrates an example where doors are provided on the storage areas 21, but other types of storage structures that do not have doors, or drawer-type storage structures can also be adopted.

The upper rack 30 includes one or a plurality of storage areas 31, a multifunctional area 32, and a hot and cold water supply area 33.

The storage areas 31 store, for example, stocks of foods and drinks, or dishes and other equipment. In FIG. 1, the storage areas 31 are provided with sliding doors as preferable examples, but similar to the storage areas 21, any arbitrary storage structure, such as other types of doors, can also be adopted.

The multifunctional area 32 is equipped with a heating apparatus such as a microwave oven or oven, or a cooling apparatus such as a refrigerator or a freezer, which is used by the crew for cooking of meals and the like before the meals are served.

A device 50 that uses fluid, such as a tank-type hot and cold water supplier or a coffee maker, and a box-shaped upper sink 60 that receives used fluid and subjects the same to drainage processing are provided in the hot and cold water supply area 33.

The work table 40 is arranged on an upper surface of the lower rack 20, and as illustrated in FIG. 1, since the upper rack 30 is formed smaller than a depth of the lower rack 20, a space can be ensured on the work table 40 on which the crew can perform preparation operations for serving meals.

A lower sink 70 configured to perform drainage processing is formed in an area on the work table 40 corresponding to the upper sink 60 of the hot and cold water supply area 33.

Figure 2:
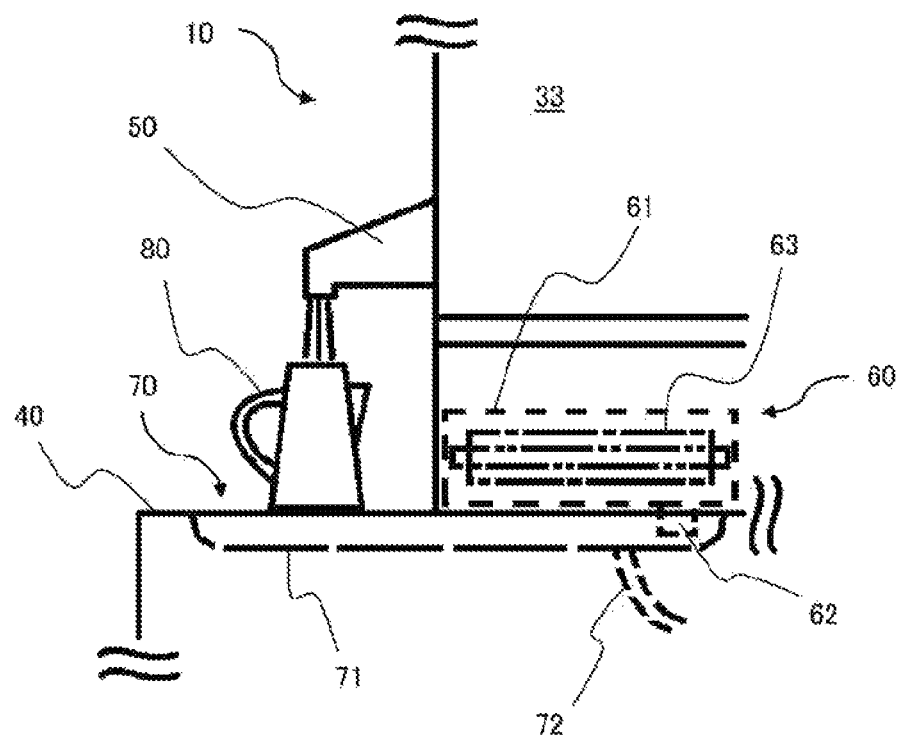
FIG. 2 is a schematic cross-sectional view illustrating a detailed structure of an area surrounding a sink in a state where an upper sink is in a retracted state of the aircraft galley unit according to the present invention.
Figure 3:
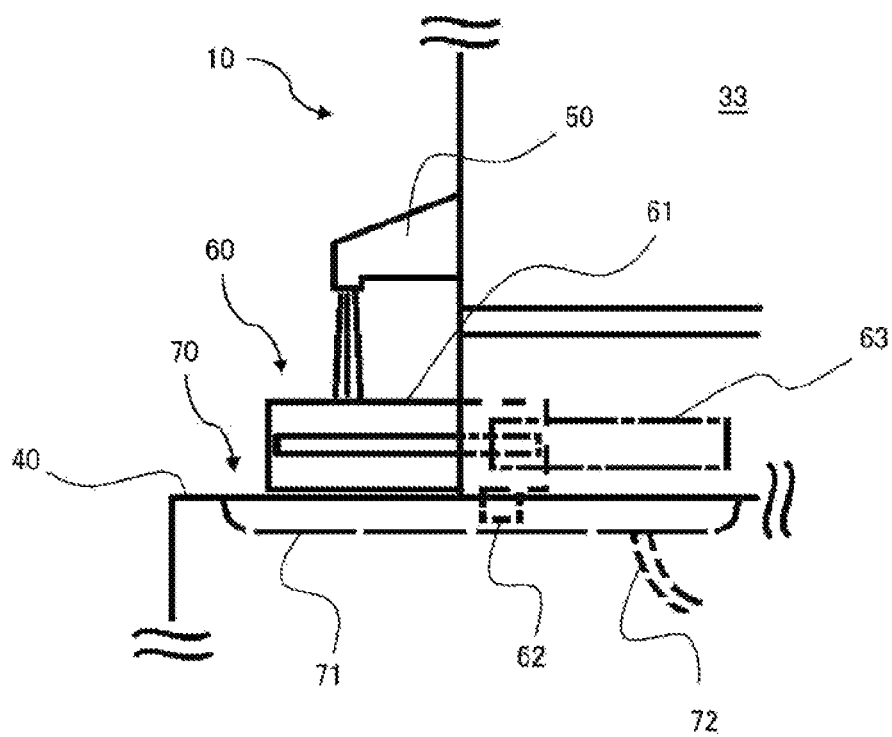
FIG. 3 is a schematic cross-sectional view illustrating a detailed structure of the area surrounding the sink in a state where the upper sink is drawn out in the aircraft galley unit according to the present invention.

FIGS. 2 and 3 are schematic cross-sectional views illustrating a detailed structure of an area surrounding the sink in the aircraft galley unit 10 illustrated in FIG. 1. FIG. 2 illustrates a state of use of the upper sink 60 in the retracted state, and FIG. 3 illustrates a state of use of the upper sink 60 in the drawn-out state.

As illustrated in FIG. 2, a lower sink, serving as a first sink, 70 arranged on the work table 40 is composed of a shallow recessed portion 71 dug down from the work table 40, and a drainage port 72 provided on the shallow recessed portion.

Meanwhile, the upper sink, serving as a second sink, 60 provided in the hot and cold water supply area 33 includes a box-shaped body portion 61, a drainage port 62 provided at a bottom portion of the body portion 61, and a slide mechanism 63 configured to move the body portion 61 horizontally between a retracted position (refer to FIG. 2) and a drawn-out position (refer to FIG. 3).

A depth (side wall height) of the box-shaped body portion 61 of the upper sink is formed to be greater than a depth of the recessed portion 71 of the lower sink 70.

Further, as illustrated in FIGS. 2 and 3, the recessed portion 71 of the lower sink 70 is formed greater than a horizontal depth and width of the body portion 61 of the upper sink 60, and the body portion 61 of the upper sink 60 is arranged at a positional relationship such that it moves in sliding motion above the recessed portion 71 of the lower sink 70.

Now, as illustrated respectively in FIGS. 2 and 3, the drainage port 62 provided on the body portion 61 of the upper sink 60 is configured to be positioned above the recessed portion 71 of the lower sink 70, at both the retracted position and the drawn-out position.

As described, the fluid received by the upper sink 60 always flows through the drainage port 62 to the recessed portion 71 of the lower sink 70, such that drainage can be performed smoothly.

As illustrated in FIG. 2, in a state where the body portion 61 of the upper sink 60 is in the retracted position, a large space can be ensured between the device 50 that uses the fluid and the recessed portion 71 of the lower sink 70, and it becomes possible to perform operation while placing a relatively large container or equipment such as a pot 80 on that space.

At this time, even if fluid such as water supplied from the device 50 spills from the pot 80, the recessed portion 71 of the lower sink 70 receives the fluid and drains the fluid through the drainage port 72, such that work space for crews can be ensured while ensuring a wide drainage region.

On the other hand, as illustrated in FIG. 3, in a state where the body portion 61 of the upper sink 60 is in a drawn-out position, the box-shaped body portion 61 is positioned directly below the device 50 using the fluid, such that operations like washing small dishes like cups and saucers can be performed in the box-shaped body portion 61.

Since the body portion 61 is equipped with the drainage port 62, the fluid such as water received by the body portion 61 during washing operation and the like flows through the drainage port 62 to the recessed portion 71 of the lower sink 70, and the drained fluid is then discharged through the drainage port 72 of the lower sink 70.

According to this configuration, when performing an operation in which water and fluid used for washing dishes may be scattered, the work space for crews can be ensured while suppressing scattering of fluid by the side wall of the box-shaped body portion 61.

Further, a closing means such as a rubber plug may be provided to the drainage port 62 of the upper sink 60. According to this configuration, fluid such as water can be filled and retained in the box-shaped body portion 61, such that water for washing operation can be saved and used effectively, and as a result, the capacity of the water tank loaded on the aircraft can be downsized and the overall weight of the aircraft can be reduced.

The galley unit according to the present invention is not restricted to the embodiments illustrated above, and includes various modifications.

Further, according to the galley unit of the present invention, a portion of a component can be added to, deleted from or replaced with other components without deviating from the scope of the present invention.

For example, the above-described embodiment has illustrated a case where there is one body portion of the upper sink, but the upper sink can have two or more body portions, wherein the body portions can be switched for the respective working areas, such as by arranging one body portion in the drawn-out position and arranging the other in the retracted position during use.

According further to the above embodiment, the body portion of the upper sink is only drawn out or retracted in one direction via a slide mechanism, but the body portion can be designed to move on a plane using a mechanism configured to move the whole slide mechanism in an intersecting direction.

REFERENCE SIGNS LIST

10 Aircraft galley unit
20 Lower rack
30 Upper rack
40 Work table
50 Device that uses fluid
60 Upper sink
61 Body portion
62 Drainage port
63 Slide mechanism
70 Lower sink
71 Recessed portion
72 Drainage port

The invention claimed is:

1. An aircraft galley unit comprising a hot and cold water supply system, a sink structure, and a work table,
wherein the sink structure comprises a double structure including a first sink which is formed in a recessed portion of the work table, and a box-shaped second sink provided above the first sink, wherein the second sink comprises a drainage port on a bottom portion, and drainage from the second sink is configured to flow through the drainage port to the first sink.

2. The aircraft galley unit according to claim 1, wherein the first sink comprises a wider area than the second sink on the work table.

3. The aircraft galley unit according to claim 2, wherein the second sink is a drawer type sink that can be drawn out above or retracted from above the work table.

4. The aircraft galley unit according to claim 3, wherein the second sink is formed deeper than a depth of the first sink.

5. The aircraft galley unit according to claim 1, wherein the second sink comprises a rubber plug for closing the drainage port, and the second sink is configured to store fluid inside the second sink.

* * * * *